United States Patent [19]

Duwaer

[11] Patent Number: 4,835,602
[45] Date of Patent: May 30, 1989

[54] COLOR PROJECTION TELEVISION SYSTEM WITH APPARATUS FOR CORRECTING MISCONVERGENCE AND MISGEOMETRY WHICH CALCULATES COEFFICIENTS OF EQUATIONS REPRESENTING DEFLECTION CORRECTION WAVEFORMS

[75] Inventor: Arne L. Duwaer, Ossining, N.Y.

[73] Assignee: North American Philips Corporation, New York, N.Y.

[21] Appl. No.: 89,899

[22] Filed: Aug. 27, 1987

[51] Int. Cl.[4] .................. H04N 9/28; H04N 9/31; H01J 29/70

[52] U.S. Cl. ........................... 358/60; 358/64; 315/368

[58] Field of Search .............. 358/56, 60, 64, 65, 358/10; 315/368

[56] References Cited

U.S. PATENT DOCUMENTS

| | | | |
|---|---|---|---|
| 3,943,279 | 3/1976 | Austefjord | 358/60 |
| 4,277,797 | 7/1981 | Dangschat et al. | 358/21 R |
| 4,485,394 | 11/1984 | Ghaem-Maghami et al. | 358/10 |
| 4,673,847 | 6/1987 | Louie et al. | 358/65 |
| 4,706,115 | 11/1987 | Colineau et al. | 358/60 |

FOREIGN PATENT DOCUMENTS

| | | | |
|---|---|---|---|
| 0127482 | 12/1984 | European Pat. Off. | 358/65 |
| 2579051 | 9/1986 | France | |
| 1517119 | 7/1978 | United Kingdom | |
| 2066029 | 7/1981 | United Kingdom | 358/64 |
| 2103450 | 2/1983 | United Kingdom | |

Primary Examiner—James J. Groody
Assistant Examiner—Randall S. Svihla
Attorney, Agent, or Firm—Edward W. Goodman

[57] ABSTRACT

A projection television convergence method and apparatus allow rapid and simple correction of low-order misconvergence and misgeometry problems. A hybrid system employs digital programmable attenuators and a digital control system, making it possible to eliminate misconvergence and misgeometry using simple local adjustment on a limited number (e.g., 9) of locations in the picture. The values of the coefficients in the correction waveforms, which are represented by the settings on a number of programmable attenuators, are determined by simultaneously solving the convergence governing equations, and are stored in memory. Thus, the prior art tedious individual adjustment of typically more than 30 potentiometers, each with global effects, by a factory worker, service-engineer or the consumer is obviated. An alternate embodiment includes a simple black and white camera to eliminate the human adjuster. The system detects areas of misconvergence or misgeometry in the composite image by measuring the luminace reflected from the screen during the projection of complementary test patterns of equal luminance in the separate image sources. The system treats areas of luminace discrepancy as misconverged areas, and causes an appropriate level of correction signals to be fed to the misconverged CRTs.

5 Claims, 8 Drawing Sheets

SHADED AREA PER CHECK:
$d^2((a)+(b)-2(a)(b))$

COLOR PROJECTION TELEVISION SYSTEM WITH APPARATUS FOR CORRECTING MISCONVERGENCE AND MISGEOMETRY WHICH CALCULATES COEFFICIENTS OF EQUATIONS REPRESENTING DEFLECTION CORRECTION WAVEFORMS

BACKGROUND OF THE INVENTION

The present invention relates generally to convergence methods and apparatuses used in projection television (PTV) systems. More particularly, the present invention relates to a method and apparatus which enable simple, accurate and rapid adjustment of the convergence in a projection television system.

Convergence in the context of the present invention may be defined as the alignment and matching of the images produced by the image sources in a color PTV system. Typical PTV systems include, inter alia, a rear projection screen for receiving a composite image to be displayed and three separate cathode ray tubes (CRTs), each for projecting a different color component—red, green or blue—of the composite image. As the three CRTs cannot be physically located in the same place, two are usually located off the axis which is perpendicular to the plane of the projection screen (the normal). This non-alignment of the CRTs is a major source of misconvergence since the images from the three CRTs do not impinge upon the projection screen identically. Other misconvergence problems are due, for example, to inherent differences between the two or more CRTs.

To compensate for distortions caused by the non-alignment of all of the CRTs with the normal, and other distortions caused by the geometry of the screen and internal distortions of the CRTs, corrective waveforms are applied to convergence dipoles of each CRT. The coefficients of the waveforms are usually determined by separate potentiometers.

For proper convergence, prior art PTV systems require the careful adjustment of more than 30 (typically 42) potentiometers, each controlling a global aspect of the composite image such as size, overall shift, linearlity and trapezium distortion to name a few. This requires skill and patience normally beyond that of the average user/consumer. Additionally, PTV systems often need to be re-converged after shipping or major changes in climate.

SUMMARY OF THE INVENTION

It is an object of this invention to provide a PTV convergence method and apparatus requiring fewer adjustments needed for correction of low-order misconvergence and misgeometry problems.

It is also an object to reduce the time required for proper convergence.

Another object is to increase the convergence accuracy obtainable in PTV systems.

A further object of the present invention is to satisfy the above-mentioned objects using a simple embodiment with which the average user can properly effect convergence.

Yet another object is to cause misconvergence and misgeometry errors to be automatically corrected on demand by the user without the need to rely on the user's ability to make visual measurements.

Some of the aforementioned objects of the invention are realized by introducing digitally programmable potentiometers (or attenuators) in the analog convergence system by introducing simple digital control circuitry. This will be referred to as a "hybrid" system. The adjustment of each CRT is accomplished with simple local adjustments at a small number of locations in the composite image (e.g., 9). The correct values of the correction currents at the local adjustment points are stored in memory. After the adjustment procedure, all of the coefficients in the corrective waveform are automatically determined, and the attenuators are adjusted by the digital circuitry by the rapid solving of simultaneous equations governing the convergence of the images. These calculations can be done cyclically to compenate for any drift in the analog waveform.

In an alternate embodiment a simple, inexpensive black and white camera is included to measure the luminance of light reflected from the screen. Between two CRTs to be converged, a checkerboard pattern of alternating colored and black checks is applied to one CRT, and a complementary pattern is applied to the other CRT, the luminance of the two separate images as seen by the camera being equal. In case of a well converged composite image the camera sees a homogeneous luminance field. The processing system treats deviations from homogeneity as misconvergence or misgeometry, and calculates from these deviations, the magnitude of the correction signal to be fed to one of the CRTs until the misconvergence or misgeometry are minimized. These calculations are based on five measurements at, for example, 9–256 areas of the composite image. All of the coefficients of the correction waveforms are again automatically calculated and stored in memory.

In this alternate embodiment the correction signal can be generated by a fully digital waveform generator.

BRIEF DESCRIPTION OF THE DRAWINGS

The present invention is described by the specification with reference to the accompanying drawings. Briefly described, the drawings are.

DETAILED DESCRIPTION OF THE INVENTION

Figure 1:
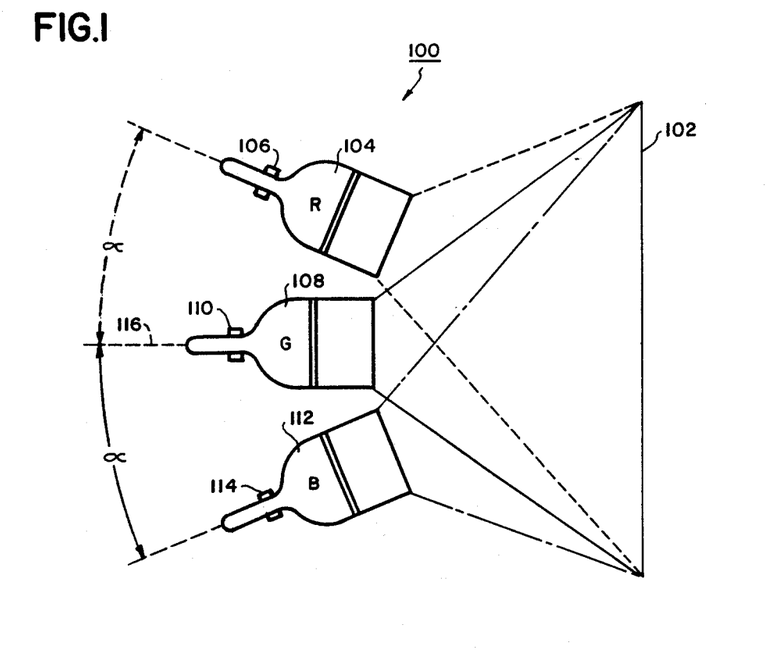
FIG. 1 is a schematic top plan view of the optical system of a typical PTV.

The projection scheme 100 for a conventional color PTV system is shown in FIG. 1. A rear projection screen 102 receives a composite image from the three CRTs 104, 108 and 112. Each CRT has an associated group of deflection coils (not shown) for applying a deflection current for deflecting an electron beam made to strike a phosphorous surface, and convergence dipoles (106, 110 and 114) for applying correction waveform currents for proper convergence. The CRT 104 projects all of the red light of the composite image, while the CRTs 108 and 112 project all of the green and blue light, respectively, to produce a full color composite image for viewing.

Figure 2:
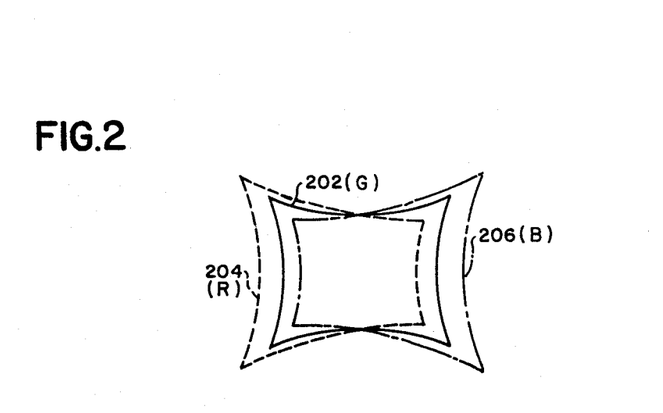
FIG. 2 is a diagram showing typical image distortion caused by the off-axis location of the cathode ray tubes shown in FIG. 1.

Because the CRTs 104 and 112 project images from an angle $\alpha$ away from the normal 116, distortions in the red and blue images result, typically as shown in FIG. 2. For example, the green CRT 108 may produce an image 202 with various forms of distortion which give it a non-rectangular shape. The red CRT 104 may produce an image with the contours of shape 204, and the blue CRT 112 may produce an image with the contours of shape 206.

The aforementioned distortions result not only in misalignment of colors which lead to false composite colors on the viewing surface 102, but also lead to both improper image sizes as well as well as other abnormalities sometimes noticeable to the viewer.

Therefore, the partial images must be corrected both to form rectangular shaped partial images of the proper dimensions, and to insure that the three partial images properly coincide. To eliminate the various distortions mentioned above, correction current waveform are fed to the convergence dipoles.

The production of these correction waveforms typically is controlled by a group of attenuators, each corresponding to a different aspect of convergence—for example, the trapezoidal distortion due to the oblique projections of the images from the red and blue CRTs onto the screen 102. Each CRT is fed a horizontal and a vertical correction waveform with the coefficients of the terms in the equations representing the waveforms being determined by a separate attenuator. Listed below are typical vertical and horizontal waveforms, $Cx(X,Y)$ and $Cy(X,Y)$, respectively.

(1) $Cx(X,Y) = Cdcx + CorxX + CsxX + CkxXY + CtxX^2 + CbxY^2 + CpcxXY^2 + CacxX^2Y + CcsxX^2Y^2$ (2) $Cy(X,Y) = Cdcy + CoryX + CsyY + CkyY^2 + CtyXY + CbyX^2 + CpcyX^2Y + CacyXY^2 + CcsyX^2Y^2$ The coefficients are as follows:
Cdc = overall shift ("disparity")
Cor = orthogonality deviation
Cs = size difference
Ck = keystone distortion due to oblique projection in the vertical direction
Ct = trapezoidal distortion due to oblique projection of red and blue images sources in horizontal direction
Cb = line-low
Cpc = pincushion distortion due to curvature of the faceplate
Cac = asymmetric corner distortion
Ccs = corner shift In prior art systems, adjustment of each coefficient/attenuator simultaneously causes changes in the geometry and convergence of the image at a large number of locations. Thus, the convergence of prior art PTV system is a tedious one.

Figure 3:
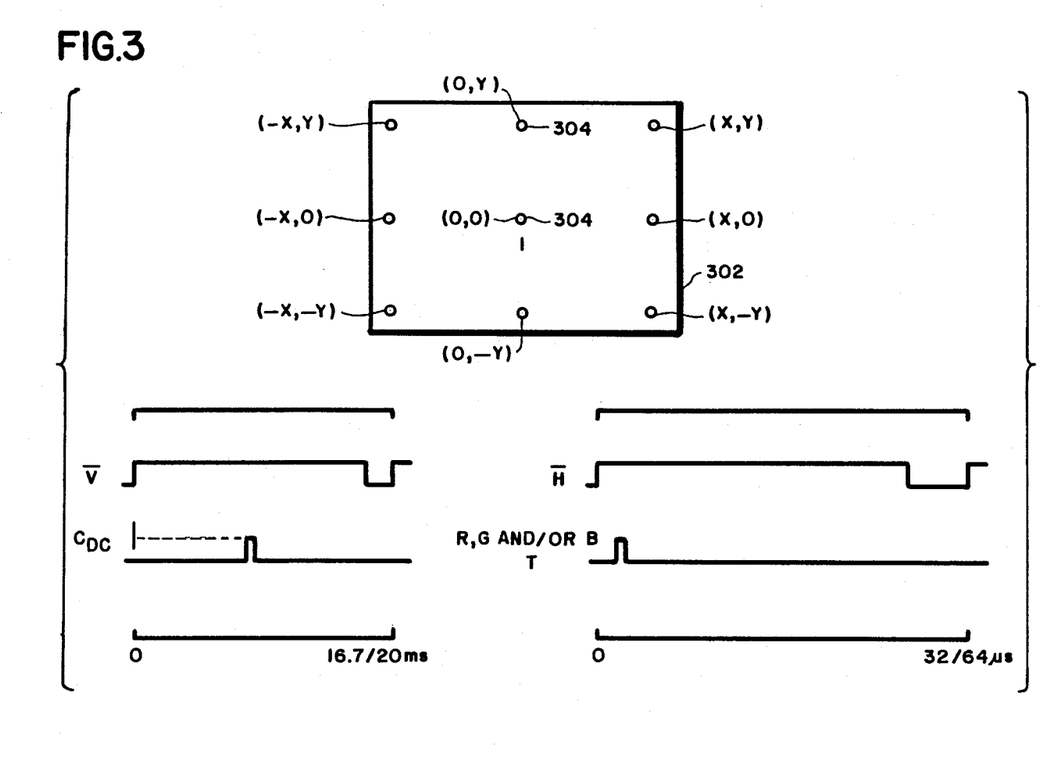
FIG. 3 is a diagram of the locations on a display screen at which local convergence adjustments are to occur, and the timing diagrams associated with the location (−X,O), as shown in the figure.

The present invention greatly facilitates the ease of convergence. It is accomplished by simple local adjustments of convergence at only a limited number of locations—9 in the preferred embodiment. FIG. 3 shows a display screen 302 with the 9 conveniently chosen local adjustment locations or points 304.

Without specifying the values, the cartesian coordinates of the local adjustment points are as follows

| | | |
|---|---|---|
| (−x, +y) | (0, +y) | (+x, +y) |
| (−x, 0)  | (0, 0)  | (+x, 0)  |
| (−x, −y) | (0, −y) | (+x, −y) |

As a result of applying the current through the convergence dipoles for proper convergence at the local adjustment points, there are 9 solutions for the 9 unknown coefficients for each of the horizontal and vertical directions.

In the X-direction:
$Cdcx = Cx(0,0)$
$Corx = [Cx(0,Y) − Cx(0,−Y)]/(2Y)$
$Csx = [Cx(X,0) − Cx(−X,0)]/(2X)$
$Cbx = [Cx(0,Y) + Cx(0,−Y) − 2Cx(0,0)]/(2Y^2)$
$Ckx = [Cx(X,Y) + Cx(−X,−Y) − Cx(−X,Y) − Cx(X,−Y)]/(4XY)$
$Ctx = [Cx(X,0) + Cx(−X,0) − 2Cx(0,0)]/(2X^2)$
$Cpcx = [Cx(X,Y) + Cx(X,−Y) − Cx(−X,Y) − Cx(−X,−Y) − 2Cx(X,0) + 2Cx(−X,0)]/(4XY^2)$
$Cacx = [Cx(X,Y) + Cx(−X,Y) − Cx(X,−Y) − Cx(−X,−Y) − 2Cx(0,Y) + 2Cx(0,−Y)]/(4X^2Y)$
$Ccsx = [Cx(X,Y) + Cx(−X,Y) + Cx(−X,−Y) + Cx(X,−Y) + Cx(−X,−Y) + Cx(X,−Y) − 2Cx(X,0) − 2(Cx(0,Y) − 2Cx(−X,0) − 2Cx(0,−Y) + 4Cx(0,0)]/(4X^2Y^2)$ In the Y-direction:
$Cdcy = Cy(0,0)$
$Cory = [Cy(X,0) − Cy(−X,0)]/(2X)$
$Csy = [Cy(0,Y) − Cy(0,−Y)]/(2Y)$
$Cby = [Cy(X,0) + Cy(−X,0) − 2Cy(0,0)]/(2X^2)$
$Cky = [Cy(0,Y) + Cy(0,−Y) − 2Cy(0,0)]/(2Y^2)$
$Cty = [Cy(X,Y) + Cy(−X,−Y) − Cy(−X,Y) − Cy(X,−Y)]/(4XY)$
$Cpcy = [Cy(X,Y) + Cy(−X,Y) − Cy(−X,−Y) − Cy(X,−Y) − 2Cy(0,Y) + 2Cy(0,−Y)]/(4X^2Y)$
$Cacy = [Cy(X,Y) + Cy(X,−Y) − Cy(−X,Y) − Cy(−X,−Y) − 2Cy(X,0) + 2Cy(−X,0)]/(4XY^2)$
$Ccsy = [Cy(X,Y) + Cy(−X,Y) + Cy(−X,−Y) + Cy(X,−Y) − 2Cy(X,0) − 2Cy(0,Y) − 2Cy(−X,0) − 2Cy(0,−Y) + 4Cy(0,0)](4X^2Y^2)$ The manually adjustable potentiometers of typical PTV systems are replaced by a system with digitally programmable attenuators that are controlled by a microprocessor system.

Figure 4:
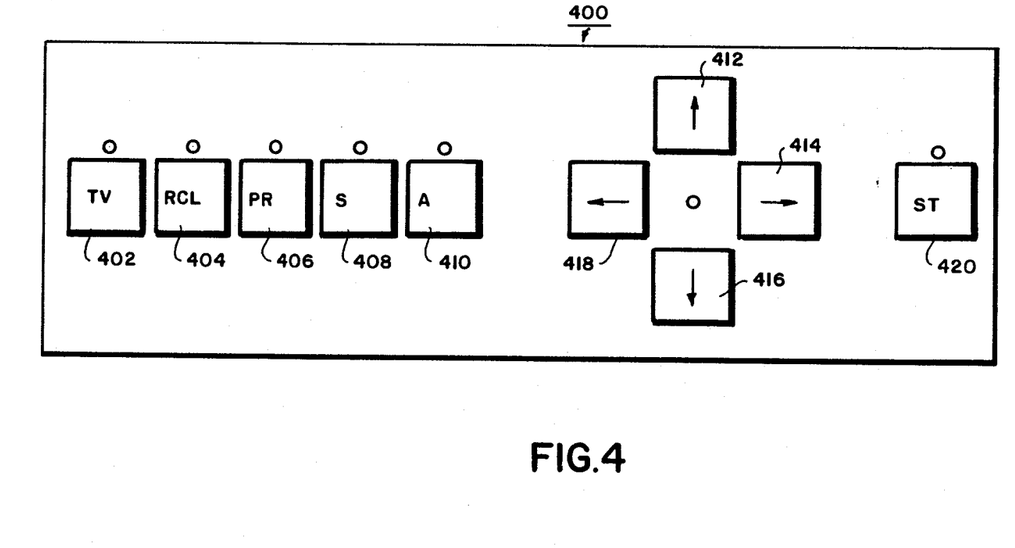
FIG. 4 is a schematic diagram of a control panel for use in the present invention.

FIG. 4 shows a convergence control panel 400 for the preferred embodiment. The various buttons displayed may contain light emitting diodes (LEDs) so that a button is illuminated when depressed. The "TV" button 402 is illuminated during normal operation of the PTV system—i.e., when no convergence adjustments are being made When convergence is altered in any way, the user may recall the previous digitally stored convergence values for the case when the geometry and convergence were correct by depressing the "RCL" button 404. However, the former self-adjusted or factory values of the coefficients may prove to be incorrect due to the changes in the conditions, such as temperature, humidity, and changes in physical dimensions caused by moving, dropping or applying vibratory forces to the PTV system.

In this case, the "PR" button 406 is depressed. Spots or small images (partial images) from each of the three CRTs are projected onto the 9 locations, one location at a time, to determine if the color of the sum of the partial images is white. If a spot color is other than white, readjustment at the location is required.

When readjustment is required, the "S" button 408 is depressed, enabling adjustment of the overall horizontal and vertical shifts of the images from the three CRTs. The system first generates spots with the red and green CRTs 104 and 108 at central locations in these images. The spots are superimposed by depressing one or more of the buttons 412–418, with the direction of shift in the images being indicated by the arrows. When the spots of the red and green CRT are superimposed the "ST" button 420 is depressed, and the adjusted values of the correction waveforms are stored in memory. The system then projects centrally located spots from both the green and blue CRTs 108 and 112 for superposition as described above. When the spots are superimposed, and the "ST" button is again depressed, the values of the correction waveform are again stored in memory.

The system then resumes projecting spots in succession at the remaining 8 local adjustment points for evaluation. If all the spots are white, proper convergence is indicated, and the "TV" button may be depressed. However, if all of the spots are not white, fine tuning adjustment is necessary, as the problems of misconvergence are beyond simple horizontal and vertical image shifts.

The "A" button 410 is depressed in this case, so that the system generates spots in succession at each of the local adjustment points. At each location the red and green spots are converged, and then the green and blue spots are converged. The "ST" button 420 is depressed after each superposition.

After superposition occurs and the values of the correction waveform are stored at a given location, the system generates the next set of spots, and the above routine is continued until all of the spots at the 9 locations are superimposed. At this point, the system calculates the correct values of the correction waveform coefficients by substituting the stored values into the equations 1 and 2. The value of the correction waveforms are then rapidly determined and applied to the convergence dipoles 106, 110 and 114. The system generates spots in succession from all three CRTs simultaneously so that the user may determine whether convergence has occurred at the local adjustment points.

If the convergence is not satisfactory to the user, the "PR" button 406 is depressed, and the routine is repeated. When convergence is satisfactory the TV button 402 is depressed, and normal TV operation starts.

In the "TV" mode, the system periodically measures the correction currents at the 9 locations and readjusts the attenuators to the stored correction waveform values if necessary.

A separate button not indicated may recall the factory settings when desired.

Figure 5:
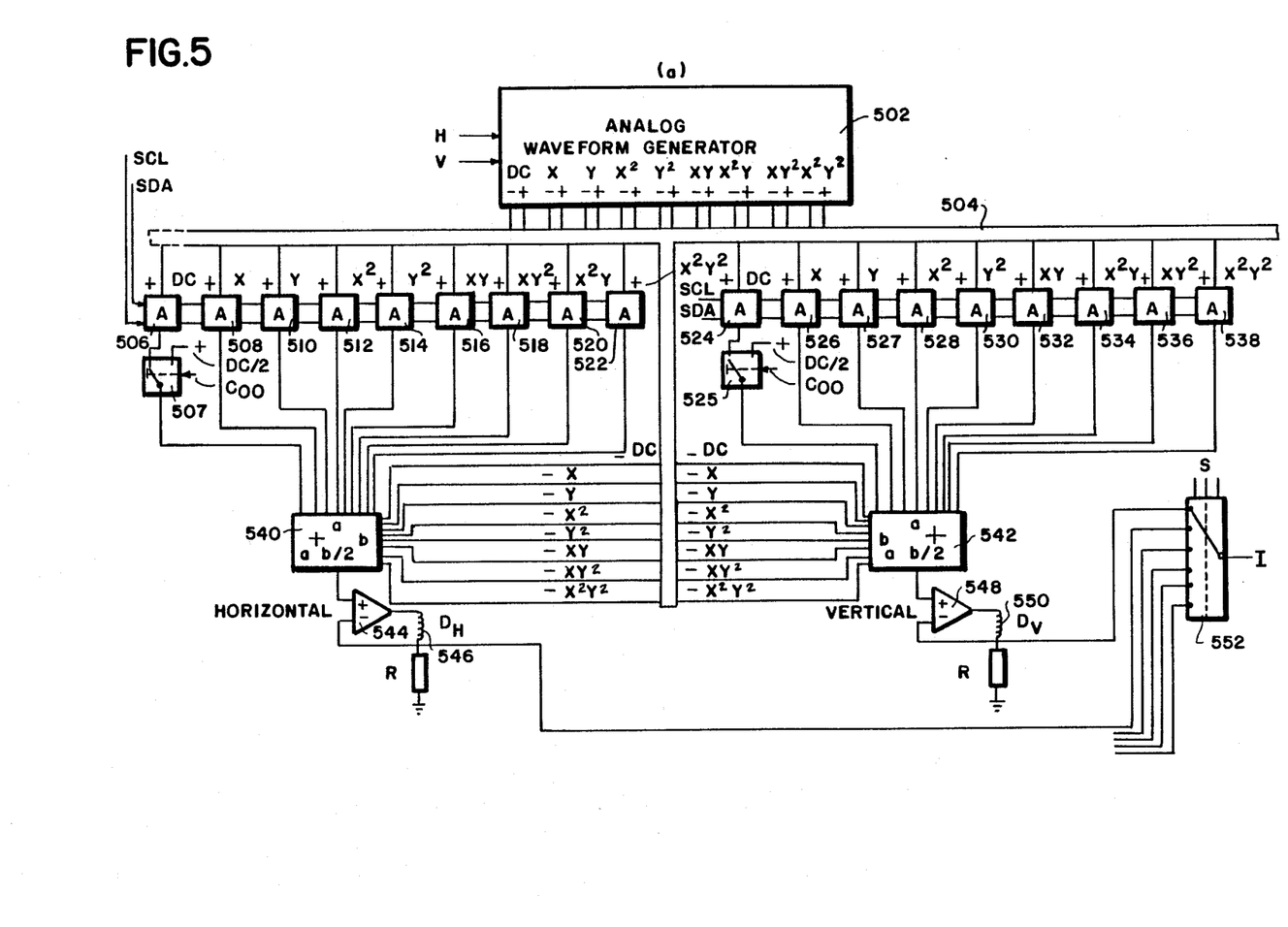
FIG. 5 is a schematic diagram of a programmable waveform generator usable in the present invention.
Figure 6:
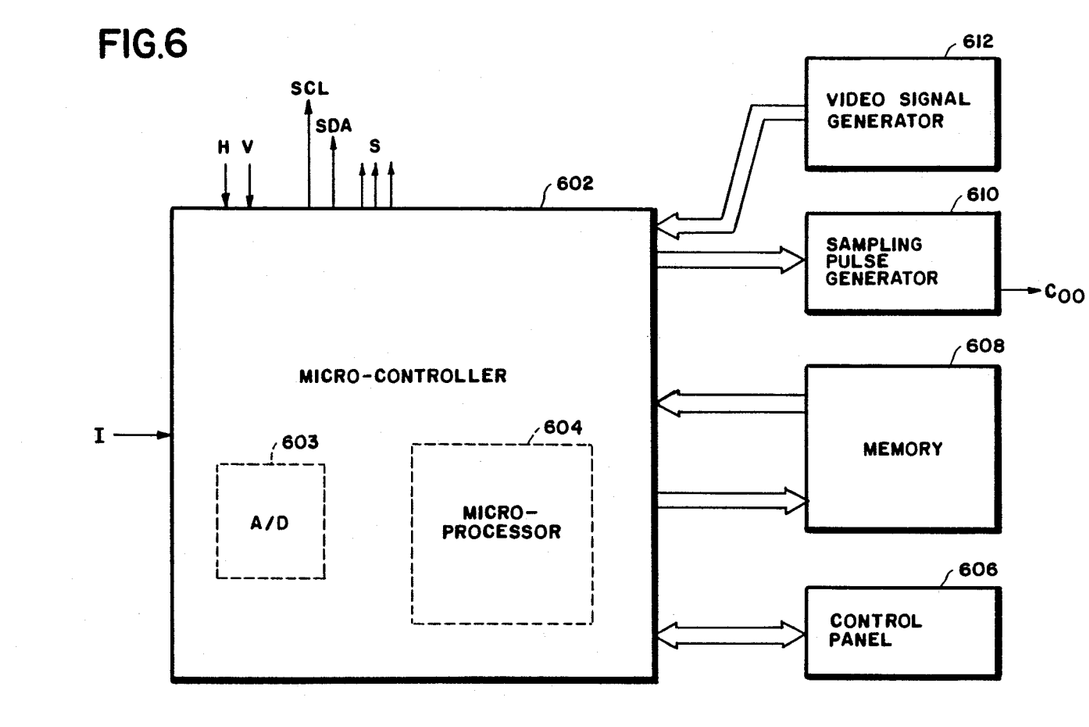
FIG. 6 is a schematic diagram of a digital control system for interface between the programmable waveform generator of FIG. 6 and the user.

FIGS. 5 and 6 in combination show a hardware implementation for the hybrid convergence system of the present invention. FIG. 5 shows a programmable waveform generator for only one of the CRTs. A separate programmable waveform generator sharing the same analog waveform generator is provided for the red and blue CRTs in the preferred embodiment. In an alternate embodiment there is also a digitally programmable waveform generator for the green CRT. An analog waveform generaor 502 generates an adjustable DC value, and the following values corresponding to the location in the image via a bus 504: $+x$, $+y$, $+x^2$, $+y^2$, $+xy$, $+x^2y$, $+xy^2$ and $+x^2y^2$. Several programmable attenuators with the "A" designation are included to realize the actual values of the coefficients in the correction waveforms. The attenuators 506, 508, 510, 512, 514, 516, 518, 520 and 522 represent the coefficients for the horizontal correction waveform, while the attenuators 524, 526, 528, 530, 532, 534, 536 and 538 represent the coefficients for the vertical correction waveform.

The optional switches 507 and 525 are for temporary presentations of the adjustable DC values during the adjustment procedure. The values from the attenuators are transferred to a corresponding adder 540 or 542 to complete the correction waveforms. The correction waveforms are applied to voltage-to-current converters 544 and 548, and finally to the horizontal convergence dipole 546 and the vertical convergence dipole 550, respectively. A switch 552 selects lines for monitoring the convergence dipole currents, including those of the other CRTs not shown in the figure.

The micro-controller 602 (FIG. 6), containing a microprocessor 604, monitors, using an analog-to-digital converter 603, the convergence of the images. The horizontal and vertical synchronization pulses H and V, are used to synchronize the analog and digital processing signal generation to the incoming video signals. The signal SCL is a clock signal controlling the operation of the attenuators, while the signal SDA selects an attenuator and supplies it with a setting. The signals S select the convergence dipole current to be measured. The signal $C_{oo}$, produced by a sampling pulse generator 610, controls the operation of the switches 507 and 525.

The convergence adjustment procedure is initiated at the control panel 606, with interfaces with the micro-controller 602. The values of the coefficients are calculated by the microprocessor 604 and stored in the memory 608. The memory 608 is of a nonvolatile, electrically erasable type, such as an EEPROM.

During operation of the PTV system in the "TV" mode, the micro-controller 602 periodically monitors the circuit I from the various convergence dipoles of the 9 positions. When these currents differ from the adjusted currents, the programmable attenuators can be re-programmed. The video signal generator 612 generates the video signals needed during the reconvergence procedure.

Figure 7:
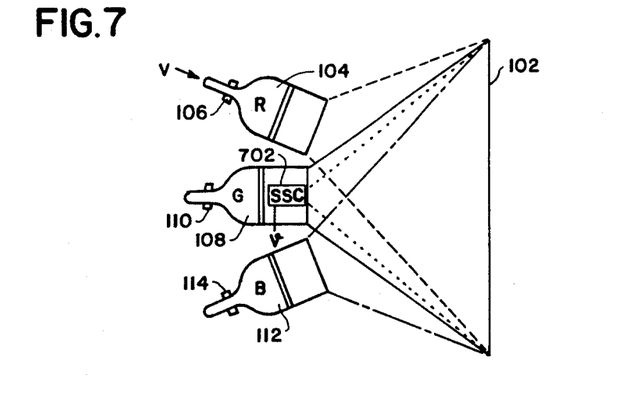
FIG. 7 is the schematic diagram of FIG. 1 with the addition of a black and white preferably solid state) camera, and represents an alternate embodiment.

The projection scheme for an alternate embodiment of the present invention is shown in FIG. 7. The embodiment in FIG. 7 is for automatic convergence of the PTV system without the need for comparison of the partial images or spots at the 9 local adjustment points by the user. The scheme in FIG. 7 is identical to that of FIG. 1, except that a solid state black and white camera 702 has been added. The solid state camera 702 is for measuring the luminance reflected from the screen 102, and may be for example, a two-dimensional ("array") sensor.

Figure 8:
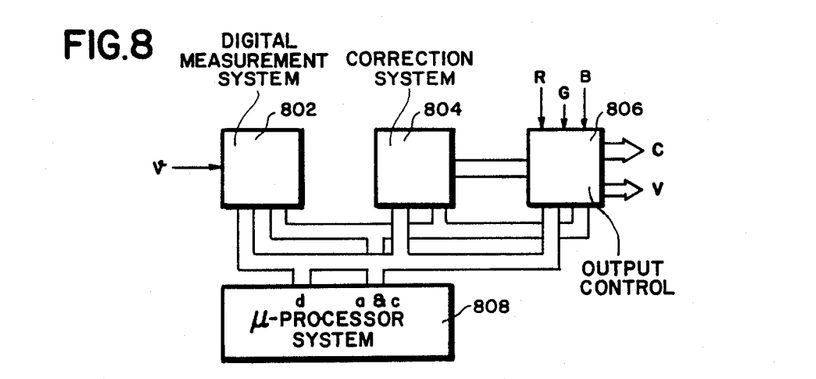
FIG. 8 is a schematic diagram of the digital control sytem used to implement the alternate embodiment.

The hardware implementation is shown in FIG. 8. The system contains a digital measurement system 802, a correction system 804, which may be hybrid or fully digital and an output control 806 all coupled to a microprocessor system 808 as shown in the figure.

Figure 9:
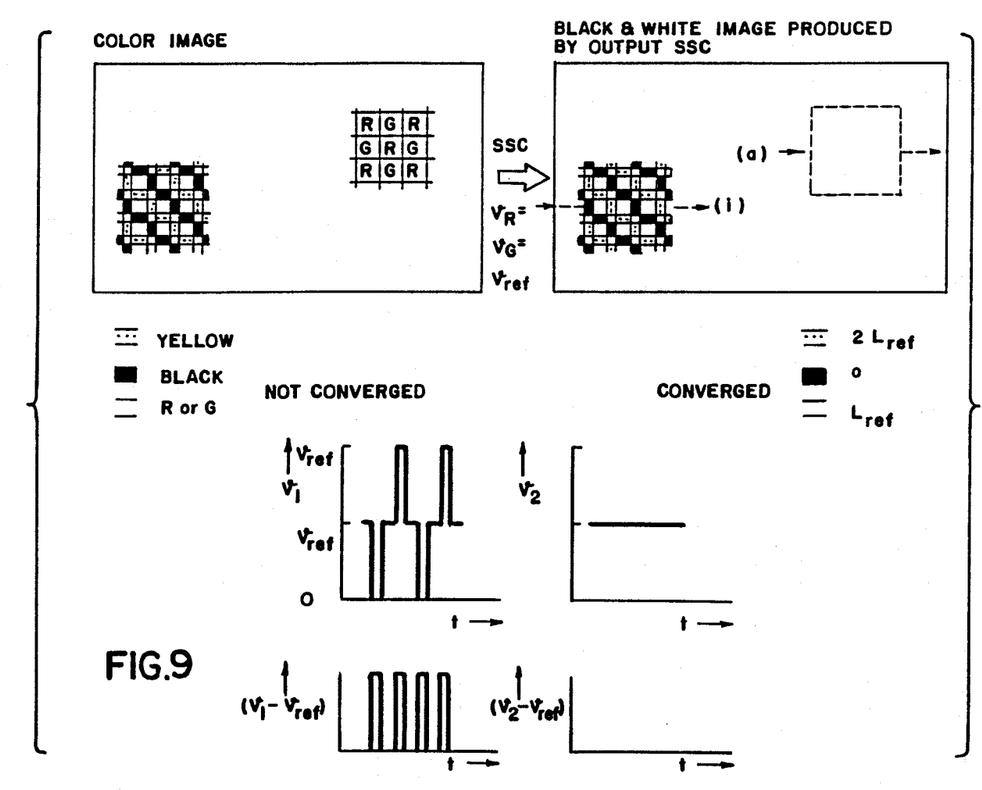
FIG. 9 is an illustration showing the basic concept behind the alternate embodiment using the black and white camera in FIG. 7.

The concept behind the automatic convergence version of the present invention is illustrated in FIG. 9. In that figure a checkerboard pattern is generated in the red CRT 104, and an inverted checkerboard pattern is generated in the green CRT 108 to correct misconvergence. Misgeometry can be corrected by generating a checkerboard pattern on the green CRT 108 and an inverted electronic checkerboard pattern that is added to the camera output signal. In the areas where the red and green CRTs are well converged, there is no overlap of the red and green checks, and the solid state camera 702 "sees" constant luminance in those areas. However, in areas where misconvergence occurs, the camera sees areas of higher luminance (the yellow regions) and dark areas where the colored checks are not contiguous. By outputting the images from the red and green CRTs at the same luminance level as seen by the camera, the digital processing system 808 can detect and process those areas of luminance discrepancy, so that the convergence system can correct the images for convergence.

Figure 10:
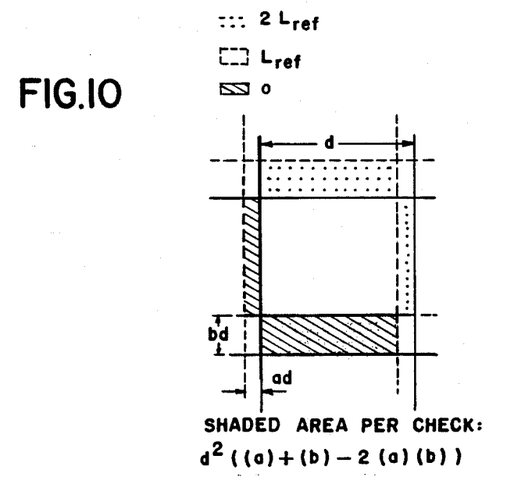
FIG. 10 is a diagram showing the area relationship between the check sizes of a checkerboard test pattern and misconverged regions to derive formulas for interpolation.

The size of the shaded areas shown in FIG. 10 compared to the check size is an indication of the amount of misconvergence or misgeometry.

Figure 11:
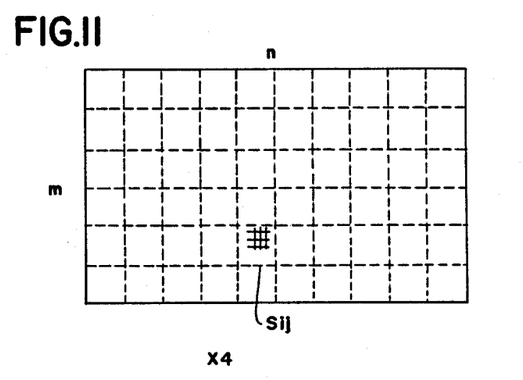
FIG. 11 is a diagram showing an example of the areas in which the amount of misconvergence is determined.
Figure 11A:
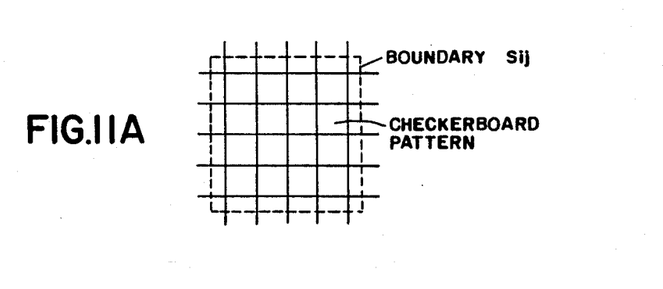

Correction signals are fed to one of the CRTs based on the calculated values for minimum misconvergence. These areas are measured for m×n areas of the picture (see FIG. 11). This is done for 5 conditions with different values for the overall horizontal and vertical shift, $S_H$ and $S_v$, respectively. In the preferred embodiment, $(S_H, S_V) = (O, O), (O, S_V), (O_1 - S_V), (S_H, O),$ and $(-S_H, O)$. A requirement is that $S_H$ and $S_V$ are smaller than half the checksize. From these measurements the $S_H$ and $S_V$ can be calculated, resulting in minimum or zero misconvergence.

Variations and modifications to the present invention are possible given the above disclosure. However, variations and modifications which are obvious to those skilled in the art are intended to be within the scope of this letters patent. For example, the number of local adjustment points may be other than 9. Additionally, the correction waveforms may be other than those disclosed, and formulas for calculation of the coefficients may differ. Also, a different video signal may be used to adjust convergence.

The programmable attenuators may be employed only for the convergence of the red and blue CRTs, and/or replaced by multiplying digital-to-analog converters.

The subject matter which I regard as my invention comprises the descriptions in the following claims:

1. An apparatus for correcting misconvergence and misgeometry in a composite image produced by at least two image sources comprising:
    means for applying correction waveforms to horizontal and vertical deflection devices of each image source, the correction waveforms being represented as a weighted sum of fixed waveforms by equations having coefficients, each coefficient corresponding to a setting of a separate programmable attenuator;
    means for generating a partial image from each image source at each of a limited number of local adjustment points;
    means for adjusting positions of the partial images at each local adjustment point via said attenuators, thereby adjusting the correction waveform until satisfactory convergence of the partial images from the image sources is obtained;
    means for sampling and storing the values of the adjusted correction waveforms at points corresponding to said local adjustment points; and
    means for simultaneously solving the equations representing the correction waveforms based on said stored values of the adjusted correction waveforms in order to calculate said coefficients.

2. The apparatus in claim 1 further comprising means for storing said calculated coefficients.

3. The apparatus in claim 2 further comprising means for, at least once after the activation of said apparatus, conforming the settings of said attenuators to the values of said calculated coefficients.

4. The apparatus in claim 2 further comprising means for, at least once after the activation of said apparatus, comparing actual values of said correction waveforms with corresponding ones of said stored values, for recalculating said coefficients so as to match said actual values of said correction waveforms with said corresponding ones of said stored values, and for conforming the settings of said attenuators to the values of said recalculated coefficients.

5. The apparatus in claim 1 further comprising at least one shared microprocessor for controlling the operation of said apparatus in response to input stimuli by a user, said microprocessor also capable of functioning for purposes other than the correction of misconvergence and misgeometry.

* * * * *